(12) United States Patent
Itazawa

(10) Patent No.: US 6,763,252 B2
(45) Date of Patent: Jul. 13, 2004

(54) PORTABLE DEVICE, INFORMATION PROCESSING APPARATUS AND METHOD FOR COMMUNICATING BETWEEN THOSE

(75) Inventor: Toshiaki Itazawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/313,194

(22) Filed: May 18, 1999

(65) Prior Publication Data

US 2002/0169001 A1 Nov. 14, 2002

(30) Foreign Application Priority Data

May 18, 1998 (JP) .......................................... 10-151921
May 13, 1999 (JP) .......................................... 11-132761

(51) Int. Cl.[7] ................................................ H04M 1/00
(52) U.S. Cl. ..................... 455/575.1; 455/557; 713/185
(58) Field of Search .......................... 455/88, 557, 418, 455/420, 90, 575, 572, 573; 713/182–186

(56) References Cited

U.S. PATENT DOCUMENTS

| | | | | |
|---|---|---|---|---|
| 5,384,834 A | * | 1/1995 | Sato | 379/88.21 |
| 5,528,667 A | * | 6/1996 | Steffensen et al. | 455/462 |
| 5,877,483 A | * | 3/1999 | Bilich | 235/382 |
| 5,907,815 A | * | 5/1999 | Grimm | 455/557 |
| 5,991,639 A | * | 11/1999 | Rautiola et al. | 455/557 |
| 6,088,450 A | * | 7/2000 | Davis et al. | 713/182 |
| 6,138,146 A | * | 10/2000 | Moon | 709/206 |
| 6,223,029 B1 | * | 4/2001 | Stenman | 455/420 |

* cited by examiner

Primary Examiner—Charles Appiah
Assistant Examiner—James Moore
(74) Attorney, Agent, or Firm—Fitzpatrick, Cella, Harper & Scinto

(57) ABSTRACT

An information processing apparatus can accommodate a portable device in a detachable way, and can detect accommodation/removal of the portable device, and can read ID information transmitted from the portable device. Therefore, access to a security system and a host computer via a same portable device can be achieved, and an individual can be relieved of the trouble of carrying to many portable devices.

31 Claims, 10 Drawing Sheets

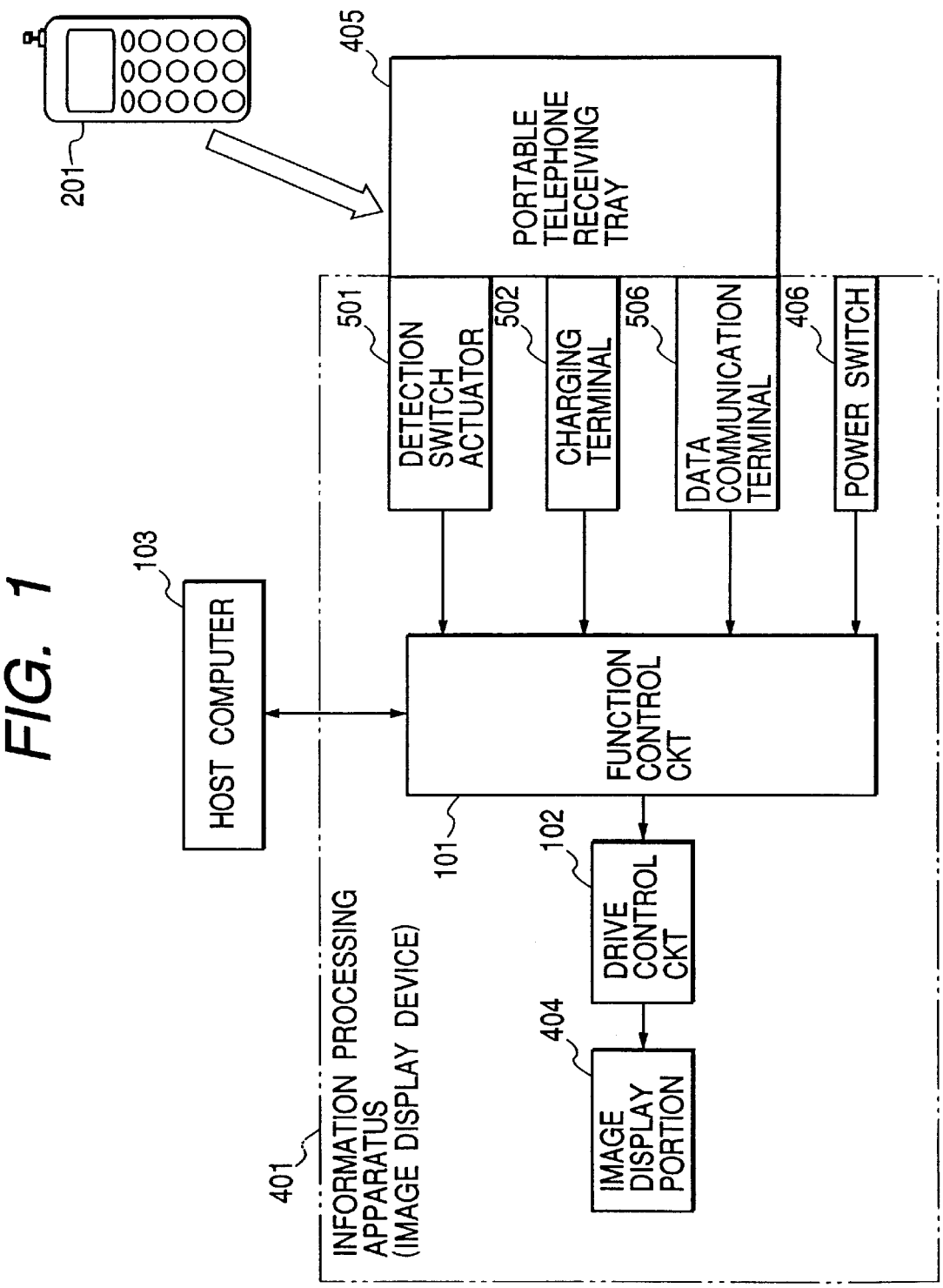

PORTABLE DEVICE, INFORMATION PROCESSING APPARATUS AND METHOD FOR COMMUNICATING BETWEEN THOSE

BACKGROUND OF THE INVENTION

1. Field of the Invention

The present invention relates to an information processing apparatus including an image display apparatus (and hereafter referred to as an information processing apparatus), a portable device, a method for communicating between those and a storage medium. More particularly, the invention relates to an information processing apparatus, a portable device, a method for communicating between devices and a storage medium which are preferable for, in a detachable way, storing a portable device such as a portable telephone set.

2. Related Background Art

A conventional computer system is, as shown in FIG. 10, configured of a computer main unit 1001, an information processing apparatus 1002, a keyboard 1003, and a mouse 1004. The computer main unit 1001 performs operation processing and has a storage device, etc. The information processing apparatus 1002 is connected via a cable with the computer main unit 1001 and displays images according to operation processing results of the computer main unit 1001. Data input devices, the keyboard 1003 and the mouse 1004 are connected to the computer main unit 1001. Further, the computer main unit 1001 is connected to a network to perform management of electronic mails (e-mails) destined for individual users and external devices such as printers.

On the other hand, in such an environment as a corporate office, one computer is not provided per information processing apparatus but a system is used where a plurality of terminals are networked with a host computer which has a high processing ability as shown in FIG. 11. The shown computer network system performs such processing as centralized data management by networking a plurality of terminals or information processing apparatuses 1102A, 1102B, 1102C, 1102D, . . . and data input devices 1103A, 1103B, 1103C, 1103D, . . . with the host computer 1101 to effectively use resources and reduce total cost through space saving and data sharing.

In an office where such a computer system is installed, terminals and desks owned by individuals are not necessarily required, i.e., individuals do not own his/her desks, and data concerning personal information such as the above e-mail data is processed using personal numbers. Moreover, in an office where such a computer system is installed, a plurality of electronic devices are often used such as ID cards for entrance/exit management and portable telephone sets including PHSs (Personal Handy-phone Systems) as well as the above e-mail as a means for communicating with individuals. In this case, the above computer system, ID card and portable telephone set are independent of one another in terms of functionality.

However, the above-mentioned prior art has the following problems. That is, when an individual performs a task using a computer, he/she has to carry two kinds of portable devices, an ID card for entrance/exit management and a portable telephone set into his/her office, start up the system or information processing apparatus, then perform operation including password entry for personal information management. Most of the portable telephone sets require charging and are connected to a charger for charging when not in use.

Thus, an individual sometimes performs task while he/she wears an ID card over the neck, with a portable telephone set connected to an information processing apparatus and a charger placed on the desk. This requires considerable space on the desk and is troublesome in that power supply for each device is need and a cumbersome startup procedure is involved. Unnecessary energy consumption due to failure to turn off power supply was another problem. Moreover, as mentioned above, when individuals do not have their own desks and telephone sets as a means for communication are fixed to desks, one knows the telephone number for a particular desk but cannot identify the person who is at the desk, thus making unknown a telephone number for an individual.

Even when an individual has temporarily left a desk with a portable device while he/she is using an information processing apparatus, he/she must return to the desk to check for incoming e-mails or terminate operation of the desktop device. This is highly troublesome.

SUMMARY OF THE INVENTION

The present invention, taking account of the above disadvantages, has a first object of providing an information processing apparatus, a portable device, a method for inter-device communication and a storage medium which relieve an individual of the trouble of carrying too many portable devices by making feasible an access to the security system and the host computer via a same portable device.

The present invention, taking account of the above disadvantages, has a second object of providing an information processing apparatus, a portable device, a method for inter-device communication and a storage medium which aim at reduction of wall outlets and improvement of space efficiency by eliminating the need for separately providing a charger in a case where a portable device which requires charging is used.

The present invention, taking account of the above disadvantages, has a third object of providing an information processing apparatus, a portable device, a method for inter-device communication and a storage medium which have eliminated the need for troublesome operation by automatically starting a computer system only when a portable device is placed on an information processing apparatus thus making the personal information of the user accessible, and which has improved security by using a password for access permission.

The present invention, taking account of the above disadvantages, has a fourth object of providing an information processing apparatus, a portable device, a method for inter-device communication and a storage medium which have allowed avoidance of unnecessary energy consumption due to failure to turn off power supply, etc. by securing ON-OFF of an information processing apparatus or a computer system.

The present invention, taking account of the above disadvantages, has a fifth object of providing an information processing apparatus, a portable device, a method for inter-device communication and a storage medium which have improved convenience and operability by allowing data communications between an information processing apparatus or a computer system in use and a portable device when an individual temporarily leaves his/her desk carrying a portable device while he/she is using the information processing apparatus or the computer system.

To attain the above objects, the present invention is characterized in that it includes an information processing apparatus connected to a higher level device such as a computer and that the information processing apparatus has a means for accommodating a portable device in a detachable way as well as connecting the portable device and the information processing apparatus main unit in such a way as communication is enabled.

To attain the above objects, the present invention is characterized in that it can transmit the ID information of a portable device to the security system which performs entrance/exit management of the owner of the portable device.

To attain the above objects, the present invention is characterized in that it includes a method for inter-device communications applied to a system equipped with an information processing apparatus connected to a higher level device such as a computer and a portable device and that the information processing apparatus which accommodates a portable device in a detachable way as well as connecting the portable device and the information processing apparatus main unit in such a way as communication is enabled has a detection step of detecting accommodation/removal of the portable device and a communication step of communicating the ID information sent from the portable device to the information processing apparatus main unit.

BRIEF DESCRIPTION OF THE DRAWINGS

FIG. 1 is a block diagram which shows in schematic form a configuration example of the control system of an information processing apparatus, a portable telephone set, and a host computer according to a first embodiment of the present invention;

FIGS. 2A, 2B and 2C are external views of a portable telephone set according to the first embodiment of the present invention, of which FIG. 2A is a front view, FIG. 2B is a right side view, and FIG. 2C is a bottom view;

FIGS. 9A and 9B are circuit diagrams for realizing charging/data communications in a system which comprises an information processing apparatus, a portable telephone set, and a host computer according to the second embodiment of the present invention, of which FIG. 9A is a circuit diagram of a high-frequency wave generator and FIG. 9B is a circuit diagram of a receiver;

DETAILED DESCRIPTION OF THE PREFERRED EMBODIMENTS

Figure 2A:
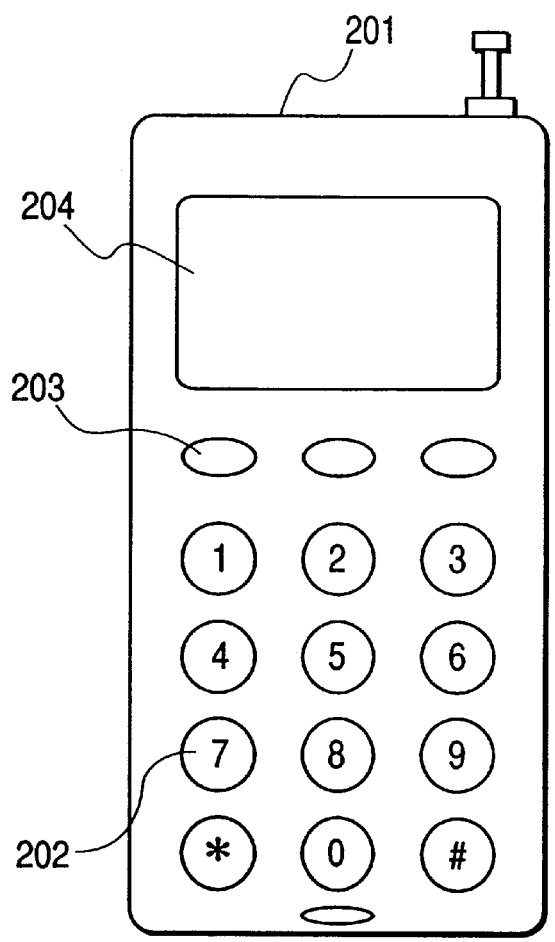

The following explains embodiments of the present invention referring to the drawings:

First Embodiment

Figure 2B:
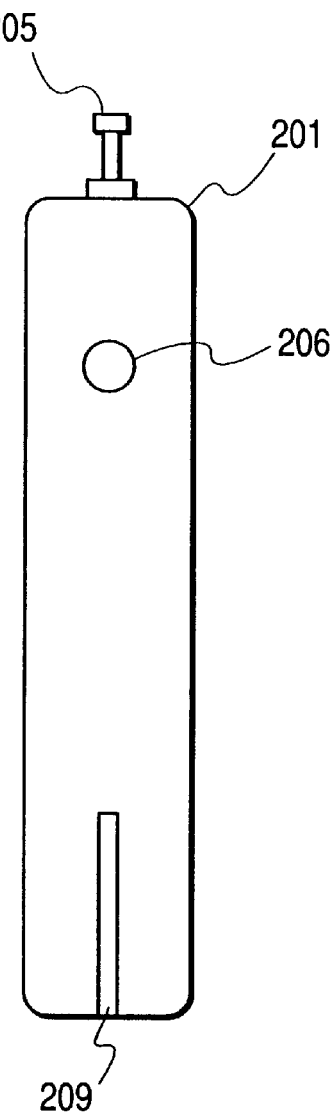
Figure 2C:
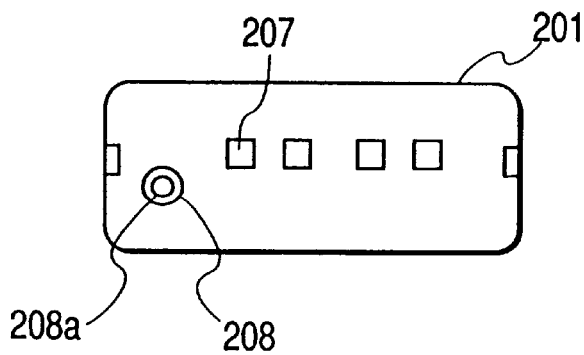

FIGS. 2A to 2C are external views of a portable telephone set 201 according to the first embodiment of the present invention, of which FIG. 2A is a front view, FIG. 2B is a right side view, and FIG. 2C is a bottom view. The portable telephone set 201 according to the first embodiment of the present invention is configured of numeric keys 202, function keys 203, an LCD (Liquid Crystal Display) 204, an antenna 205, an ID button 206, charging and data transfer terminals 207, a concave section 208, and a groove section 209.

The following details the above sections. The numeric keys 202 are used for such operation as input of telephone numbers. The function keys 203 are used for power ON/OFF and call origination/answer to incoming calls. The LCD 204 displays telephone numbers/messages/dates, etc. The antenna 205 transmits/receives radio waves. The ID button 206 is used in transmitting IDs assigned to individuals over radio waves. The charging and data transfer terminals 207 are, for example, configured of four terminals, of which two terminals are charging terminals and the other two are data transmission terminals. The concave section 208 and the groove section 209 are respectively provided on the bottom and side wall of the cabinet of the portable telephone set 201 in order to accommodate the portable telephone set 201 in the portable telephone set receiving tray of the information processing apparatus. The concave section 208 is provided with a protrusion 208a which will be explained later.

The portable telephone set 201 is so configured that, as mentioned earlier, it transmits via radio waves a number (ID) assigned to an individual user as in the case it is usually used as a telephone set, by the user's pressing the ID button 206. Note that this operation is made using a low output power. Further, the portable telephone set 201 is so configured that the above ID is transmitted from the data transmission terminal of the charging and data transfer terminals 207.

Figure 3:
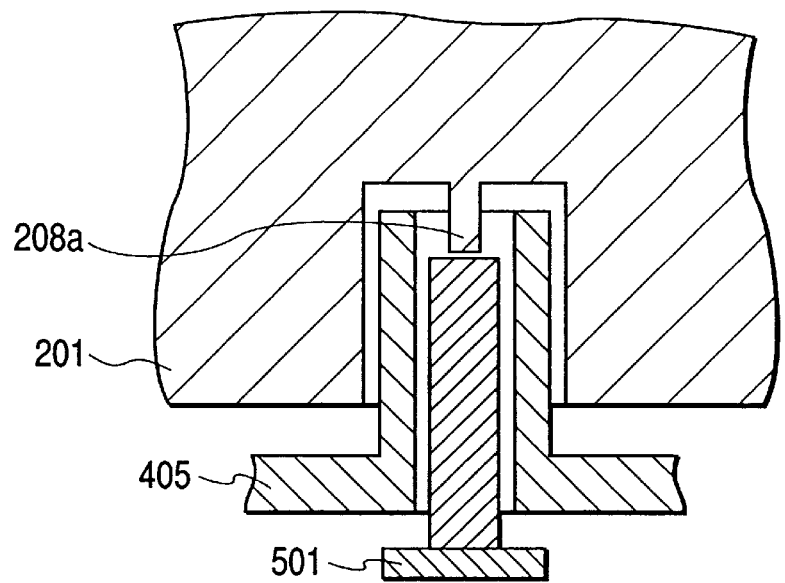
FIG. 3 is an enlarged cross-sectional view of the concave section of a portable telephone set, the portable telephone set receiving tray of an information processing apparatus, and a detection switch actuator according to the first embodiment of the present invention.

FIG. 3 is an enlarged cross-sectional view of the concave section 208 of a portable telephone set 201, the portable telephone set receiving tray 405 of an information processing apparatus explained later, and a detection switch actuator 501 according to the first embodiment of the present invention. The concave section 208 of the portable telephone set 201 is formed in cylinder, and in the center of the concave section is disposed a columnar protrusion 108a toward the bottom of the cabinet of the portable telephone set. That is, the concave section 208 is so configured that the protrusion 108a of the portable telephone set 201 presses the detection switch actuator 501 of the information processing apparatus when the portable telephone set 201 is accommodated in the portable telephone set receiving tray 405 of the information processing apparatus.

Figure 4:
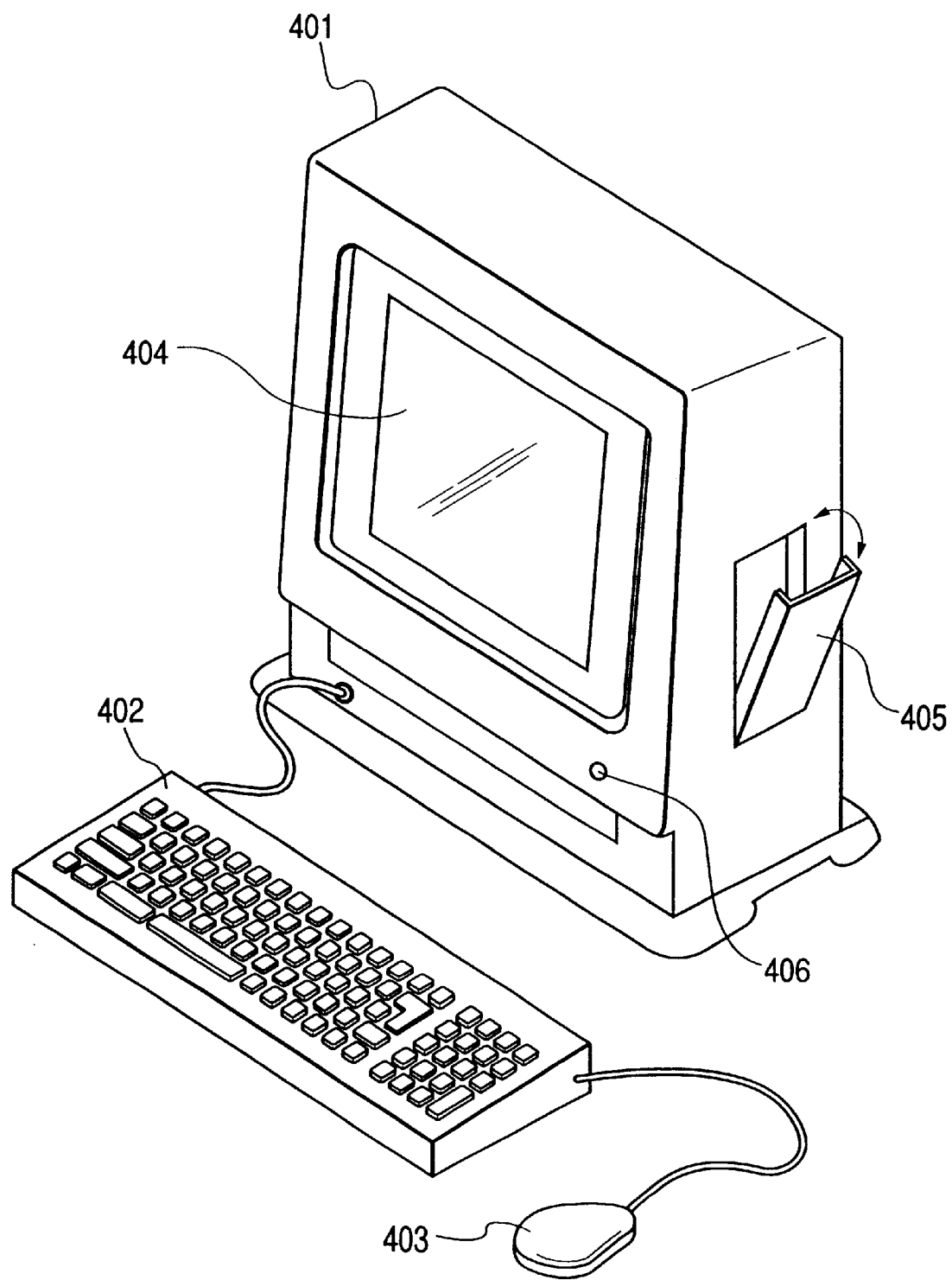
FIG. 4 is an external view of the configuration example of an information processing apparatus, a keyboard, and a mouse which are part of a computer system according to the first embodiment of the present invention.

FIG. 4 is an external view of the configuration example of an information processing apparatus (as described above, including the meaning of an image display device) 401, a keyboard 402, and a mouse 403 which are part of a computer system according to the first embodiment of the present invention. The information processing apparatus 401 has a screen of an image display section 404, a portable telephone set receiving tray 405, and a power switch 406 outside the cabinet as well as a variety of circuits, etc. mentioned later inside the cabinet.

The following details the above sections. In the information processing apparatus 401, the image display section 404 is configured of a highly space-saving, for example, an LCD unit which displays information on a host computer (not shown). The display system of the image display section 404 is not restricted to an LCD but another display system can be employed. The portable telephone set receiving tray 405 is disposed to allow opening/closing for example on the side wall of the cabinet of the information processing apparatus. That is, the bottom of the portable telephone set receiving tray is fixed to the side wall of the cabinet of the information processing apparatus via a shaft so that the portable telephone set receiving tray 405 can be rotated in the direction of the arrow shown in the figure. By allowing opening/closing of the portable telephone set receiving tray 405, the portable telephone set 201 can be accommodated in the information processing apparatus 401 after it is placed in the portable telephone set receiving tray 405.

Inside the cabinet of the information processing apparatus 401 are disposed a backlight illuminating the image display section 404 from background, an inverter, a drive control circuit controlling LCD drive operation of the image display section 404, a function control circuit controlling other functions of the image display section 401, and a power supply, etc. Configuration of the above control system of the information processing apparatus 401 will be explained later referring to FIG. 1. The information processing apparatus 401 is electrically connected to a host computer and powered via a connector and a cable arranged at the back of the cabinet (these are not shown).

On the other hand, a keyboard 402 and a mouse 403 are electrically connected to an information processing apparatus 401 via connectors and cables as well as electrically connected to the host computer (not shown) via the information processing apparatus 401. This allows the user to perform data communications with the host computer (not shown) via the information processing apparatus 401 by operating the keyboard 402 and the mouse 403.

Figure 5:
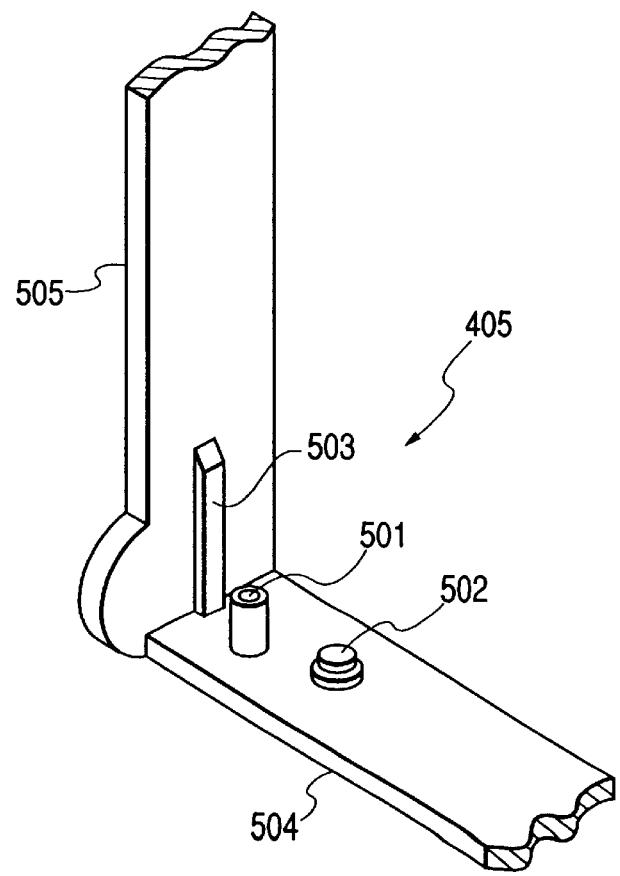
FIG. 5 is an enlarged perspective view of part of the bottom section of a portable telephone set receiving tray of an information processing apparatus according to the first embodiment of the present invention.

FIG. 5 is an enlarged perspective view of part of the bottom section of a portable telephone set receiving tray 405 of an information processing apparatus 401 according to the first embodiment of the present invention. At the bottom 504 of the portable telephone set receiving tray 405, the detection switch actuator 501 and the charging terminal 502 are disposed. A data communication terminal 506 shown in FIG. 1 as explained later is not shown in FIG. 5. A protrusion 503 is formed on the side wall 505 of the portable telephone set receiving tray 405.

The following details the above sections. The detection switch actuator 501 detects that the portable telephone set 201 is placed in the portable telephone set receiving tray 405 of the information processing apparatus 401 and configured as a cylindrical non-movable section externally and movable section in the center. When the portable telephone set 201 is placed in the portable telephone set receiving tray 405, the protrusion 208a of the portable telephone set 201 presses the detection switch actuator 501 of the portable telephone set receiving tray 405 and accordingly the detection switch (not shown), allowing detection of presence/absence of the portable telephone set 201.

The detection switch actuator 501 is enclosed by a cylindrical non-movable section externally as mentioned above, thus preventing inadvertent push on the detection switch actuator 501. The shown charging terminal 502 is one of the two charging terminals placed in the portable telephone set receiving tray 405 and disposed to correspond to the charging terminal 207 at the bottom of the portable telephone set 201.

The charging terminal 502 of the portable telephone set receiving tray 405 is movable in the vertical direction as shown in the figure to enhance contact with the charging terminal 207 of the portable telephone set 201. That is, in a state where the portable telephone set 201 is placed in the portable telephone set receiving tray 405, the charging terminal 502 of the portable telephone set receiving tray 405 pressed by the charging terminal 207 of the portable telephone set 201 keeps giving a reactive force. At the bottom 504 of the portable telephone set receiving tray 405, two similar charging terminals and data communication terminals, total four, are disposed. (In FIG. 1 referenced later, two charging terminal are shown as a charging terminal 502 and two data communication terminals are shown as a data communication terminal 506.)

Further, on the side wall 505 of the portable telephone set receiving tray 405 is formed a rib-shaped protrusion (guide rib) 503 as mentioned earlier, which is engaged with a groove section 209 formed on the side wall of the cabinet of the portable telephone set 201 to prevent inadvertent insertion and enhance hold capability.

The detection switch actuator 501 and the charging terminal 502, etc. of the portable telephone set receiving tray 405 are electrically connected to the function control circuit of the information processing apparatus 401 for control of switch information by the function control circuit. The power switch 406 shown in the above FIG. 4 is also connected to the function control circuit. These will be explained referring to FIG. 1 later.

FIG. 1 is a block diagram which shows in schematic form a configuration example of the control system of an information processing apparatus 401, a portable telephone set, and a host computer according to the first embodiment of the present invention. The information processing apparatus 401 is so configured that it comprises a function control circuit 101, drive control circuit 102, an image display section 404, a portable telephone set receiving tray 405, a detection switch actuator 501, a charging terminal 502, a data communication terminal 506, a power switch 406, and a power supply (not shown), etc.

The following details the above sections. The function control circuit 101 has a least five functions: (1) a function of monitoring the state of the detection switch actuator 501 and the power switch 406 irrespective of power ON/OFF of the information processing apparatus 401; (2) a function of detecting accommodation of the portable telephone set 201 in the portable telephone set receiving tray 405 and turning on the power supply of the information processing apparatus 401 and a function of starting charging power feeding and controlling charging power feeding; (3) a function of reading an ID from the portable telephone set 201 via the data communication terminal 506 and making the ID recognized by the host computer 103, then performing password authentication for granting access to personal information; (4) a function of terminating connection of the portable telephone set 201 and the information processing apparatus 401 to the host computer 103 on detecting that the portable telephone set 201 is no longer accommodated in the portable telephone set receiving tray 405; and (5) a function of performing time management until the start of termination process and a function of changing time setting via an external input device.

The drive control circuit 102, as mentioned above, controls LCD drive operation of the image display section 404.

The information processing apparatus 401 is connected to the host computer 103 via the above function control circuit 101, the connector and the cable disposed at the rear of the cabinet of the information processing apparatus. Components which are common to components shown in FIGS. 2A to 2C, 4, and 5 are given the same signs. The above-mentioned backlight, inverter, and power supply, etc. provided on the information processing apparatus 401 are not shown.

Figure 6:
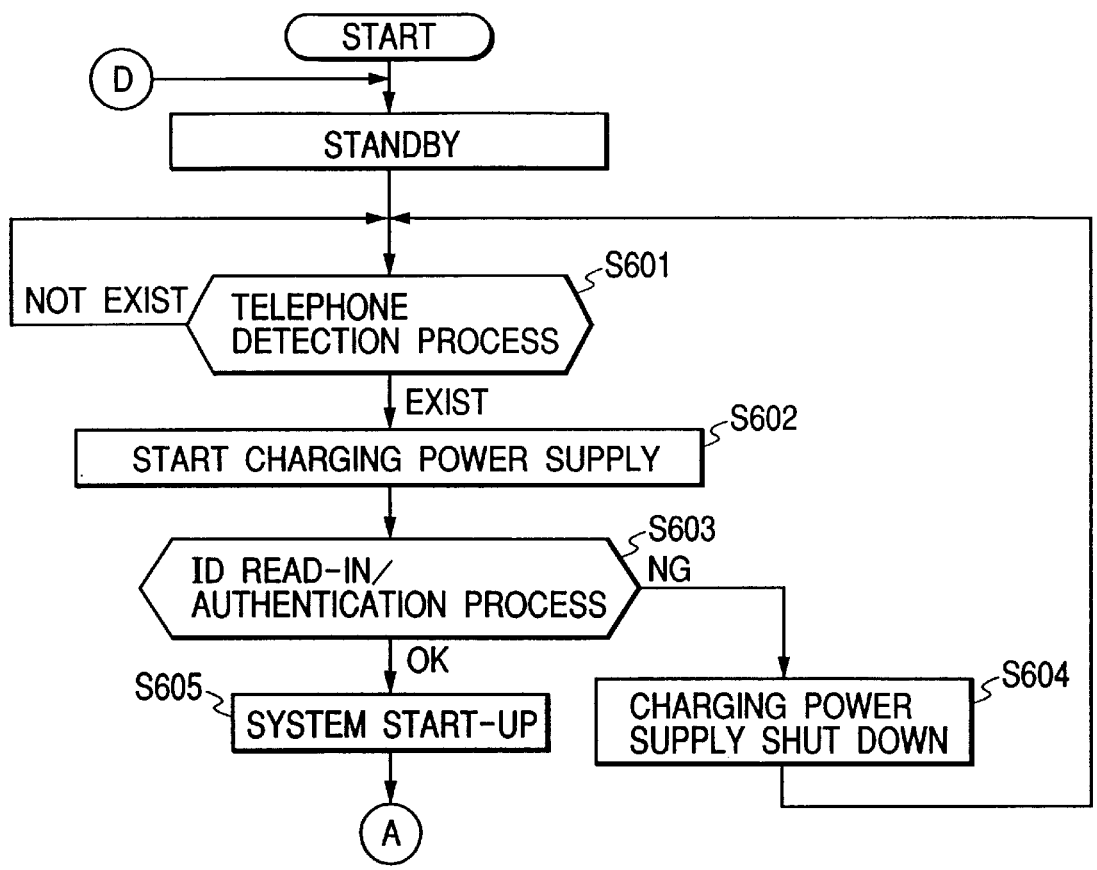
FIG. 6 is a flowchart showing the process in a system which comprises an information processing apparatus, a portable telephone set, and a host computer according to the first embodiment of the present invention.
Figure 7:
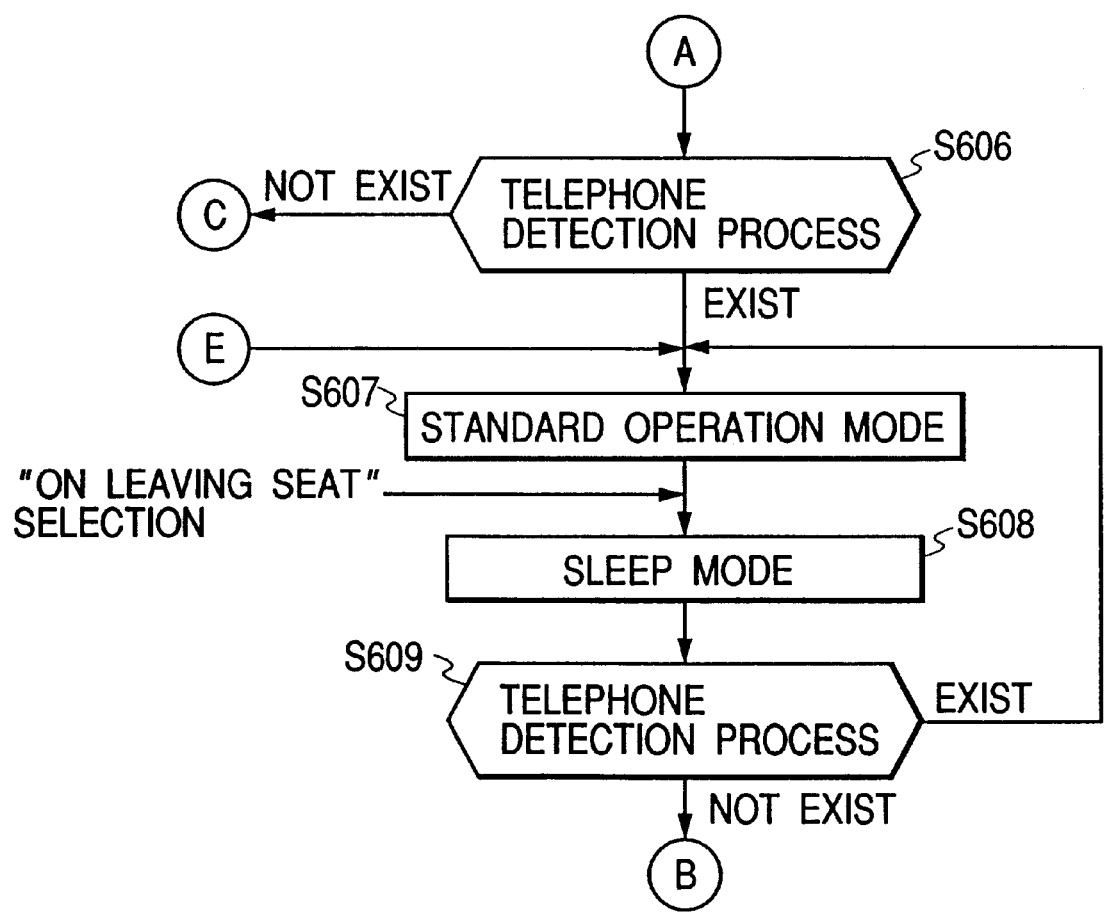
FIG. 7 is a flowchart showing the process in a system which comprises an information processing apparatus, a portable telephone set, and a host computer according to the first embodiment of the present invention.
Figure 8:
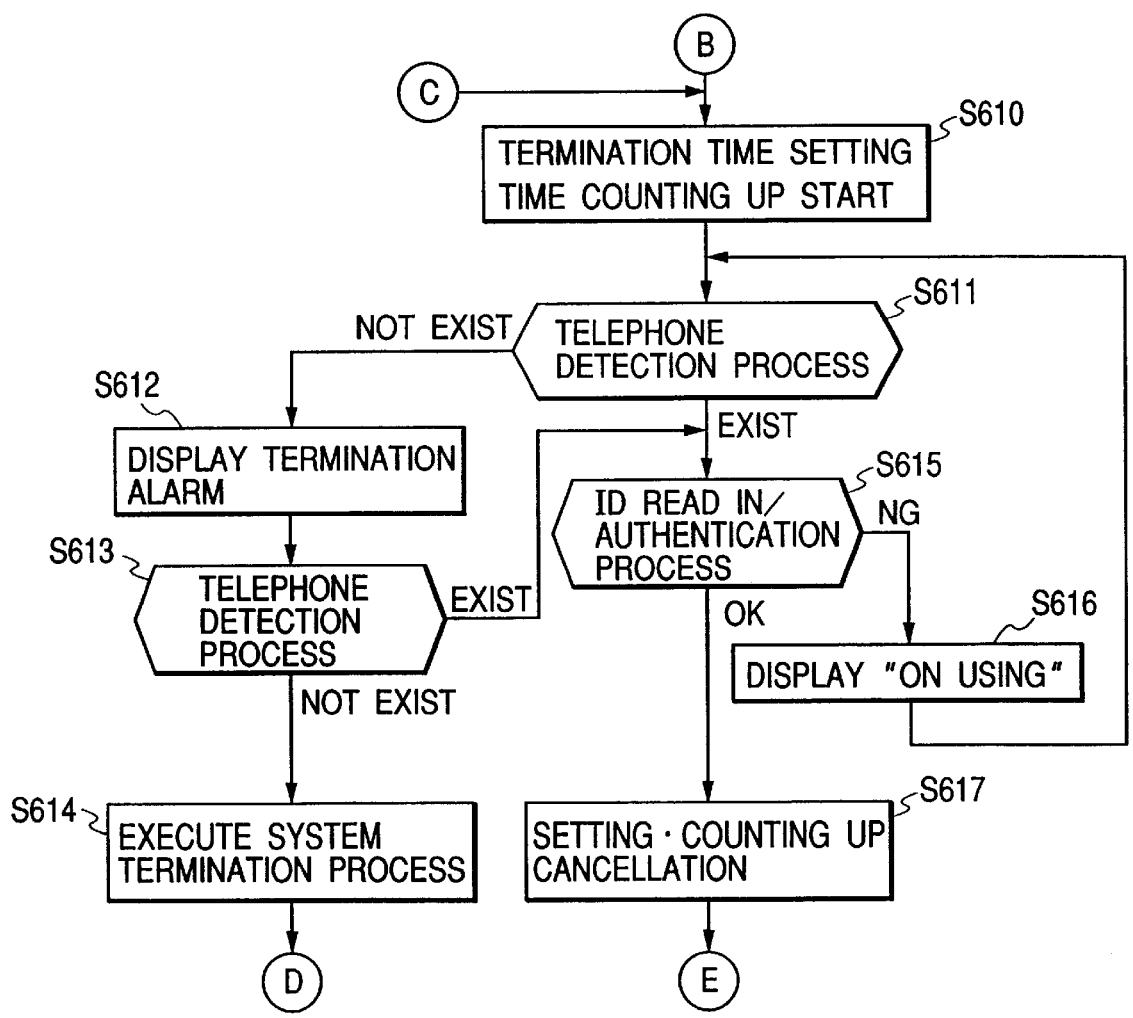
FIG. 8 is a flowchart showing the process in a system which comprises an information processing apparatus, a portable telephone set, and a host computer according to the first embodiment of the present invention.

Next, each function of a system from entrance into an office to exit from the office which accommodates the system provided with an information processing apparatus 401, a portable telephone set 201 and a host computer 103 according to a first embodiment of the present invention, will be explained to the movement of an individual, referring to the flowcharts in FIGS. 6 through 8.

The office where this system is installed assumes that entrance/exit of an individual is managed at the doorway, for example, by a security system. Mr. A who has a portable telephone set 201 when entering an office presses the ID button 206 of the portable telephone set 201 at the doorway of the office to transmit the ID code from the portable telephone set 201 to the security system. The security system opens the door at the doorway only when the above ID code transmitted from the portable telephone set 201 matches the ID code of an individual who is allowed to enter the office.

Mr. A who has entered the office does not have a fixed desk assigned and selects an unoccupied desk and an information processing apparatus 401 and places the portable telephone set 201 in the portable telephone set receiving tray 405 of the information processing apparatus 401 and accommodates the set in the cabinet of the information processing apparatus 401. The function control circuit 101 of the information processing apparatus 401 monitors the state of the detection switch actuator 501 of the portable telephone set receiving tray 405 even when the information processing apparatus 401 is turned off; the circuit determines whether the portable telephone set 201 is placed in the portable telephone set receiving tray 405 based on presence/absence of output signal from the detection switch (not shown) which accompanies operation of the detection switch actuator 501 (step S601).

Because in this case the portable telephone set 201 is accommodated in the portable telephone set receiving tray 405, the function control circuit 101 of the information processing apparatus 401 recognizes that the portable telephone set 201 is accommodated in the portable telephone set receiving tray 405 and initiates startup of the information processing apparatus 401 and feeding the charging power to the portable telephone set 201 (step S602). The portable telephone set 201, on detecting start of feeding the charging power, transmits the ID code of Mr. A stored in advance in the portable telephone set 201 to the data transfer terminal 207 at the bottom of the portable telephone set.

This allows the function control circuit 101 of the information processing apparatus 401 to read the ID code transmitted from the portable telephone set 201 via the data communication terminal 506 and transmits the ID code to the host computer 103. The host computer 103 then requests a password and only when the entered password is correct, the host computer 103 authenticates that the user is Mr. A (step S603). When the host computer 103 does not authenticate that the user is Mr. A (NG), the function control circuit 101 of the information processing apparatus 401 stops feeding the charging power to the portable telephone set 201 (step S604). On the other hand, when the host computer 103 authenticates that the user is Mr. A (OK), the function control circuit 101 of the information processing apparatus 401 starts up the system (step S605) and makes accessible the personal information and shared information of Mr. A managed by the host computer 103.

Personal information here refers to information which should be used and managed by individuals, for example information on e-mails, files and folders managed by individuals, and applications in daily use and a variety of configuration environments and so on. Shared information refers to a bulletin board, read files and folders, and standard applications and so on.

Through the above control by the information processing apparatus 401, Mr. A has only to place his portable telephone set 201 in the portable telephone set receiving tray 405 of any information processing apparatus 401 in the office to automatically start the system, allowing work using the information processing apparatus 401 to be started.

Assume a case where for example there is an incoming call to Mr. A after startup of the system. Mr. A opens the portable telephone set receiving tray 405 to remove the portable telephone set 201 attached to the information processing apparatus 401 then starts conversation. In this practice, the function control circuit 101 of the information processing apparatus 401 detects, via the detection switch actuator 501, whether the portable telephone set 201 has been removed from the portable telephone set receiving tray 405 (step S606). If the portable telephone set 201 has not been removed from the portable telephone set receiving tray 405, the function control circuit 101 of the information processing apparatus 401 places the system in the standard operation mode (step S607).

If the portable telephone set 201 has been removed from the portable telephone set receiving tray 405, the function control circuit 101 of the information processing apparatus 401 starts preparation for termination process (termination time setting, start of time counting up) (step S610) but does not change the operation mode. Preparation for termination process here refers to performing time management until connection to the above host computer 103 is canceled and the information processing apparatus 401 itself is turned off. The time of preparation for termination process is set to time until the system is shut down, for example five minutes.

If conversation ends within this time and Mr. A places the portable telephone set 201 in the portable telephone set receiving tray 405 of the information processing apparatus 401, the function control circuit 101 of the information processing apparatus 401 detects the portable telephone set 201 via the detection switch actuator 501 (step S611) and if ID matches (OK in step S615) the circuit cancels the above preparation for termination process (step S617) to continue the current operation mode. In this case, termination process is set to display warning on the image display section 404 of the information processing apparatus 401 prior to the execution for example one minute and fifteen seconds. Moreover, when wishing to extend the above termination process time while engaged in a call, Mr. A can add for example five more minutes each time he presses the power switch 406 of the information processing apparatus 401.

Next assume a case where Mr. A has an engagement outside the office but he is coming back soon, and he uses a keyboard 402 or a mouse 403 to select work continuation on the screen of the image display section 404 of the information processing apparatus 401, removes the portable telephone set 201 from the portable telephone set receiving tray 405, then leaves the office. In this practice the function control circuit 101 of the information processing apparatus 401 places the system in the sleep mode (step S608), setting the time until execution of termination process to for example one hour.

Further, setting is automatically made to notify the portable telephone set 201 of Mr. A of any incoming e-mail while he is not at the desk, allowing Mr. A to know incoming e-mails if any. If the contents of the incoming e-mail is transferred via data communications to the portable telephone set 201 and the data is stored in the memory of the portable telephone set 201, he can read the e-mail using the portable telephone set 201. Said data communications can be realized rather easily by allowing the host computer to be connected to a telephone exchange and remote operation is enabled such as terminating use of the information processing apparatus 401 as a terminal by using the portable telephone set 201 to transmit a command to execute termination process of the information processing apparatus 401. Further, by implementing a system where voice recognition is allowed, said command transmission or data input via voice can be realized using a microphone of the portable telephone set.

It goes without saying that said remote operation corresponds only to the ID of the portable telephone set 201 removed from the information processing apparatus 401.

Next, assume a case where Mr. B enters the office while Mr. A is not at the desk and places Mr. B's portable telephone set in the portable telephone set receiving tray 405 in order to use the information processing apparatus 401. The function control circuit 101 of the information processing apparatus 401 detects Mr. B's portable telephone set via the detection switch actuator 501 (steps S609, S611) and because ID code does not match (NG in step S615), display the "on using" message on the image display section 404 (step S616). When Mr. B, checking the display, picks up his portable telephone set 201, the function control circuit 101 of the information processing apparatus 401 detects removal of Mr. B's portable telephone set 201 via the detection switch actuator 501 (step S611) then enters the sleep mode again (step S608).

Next, assume a case where Mr. A, returning to the office, has terminated the remaining work and selects work termination on the screen of the image display section 404, then leaves the office. Because work termination is selected, the function control circuit 101 of the information processing apparatus 401 ignores the termination process preparation time, displays the termination alarm in the image display section 404 (step S612), detects removal of Mr. A's portable telephone set 201 from the portable telephone set receiving tray 405 (step S613) then executes system termination process (step S614) to enter the power off state. The above-mentioned set time is initial setting which can be changed by the user after system startup.

As mentioned above, according to a first embodiment of the present invention, the information processing apparatus 401 has a portable telephone set receiving tray 405 which accommodates a portable telephone set 201 in a detachable way as well as connects the portable telephone set 201 and the information processing apparatus 401 in such a way as communication is enabled; a detection switch actuator 501 which detects accommodation/removal of the portable telephone set 201; a data communication terminal 506 which communicates the ID information transmitted from the portable telephone set 201 to the information processing apparatus 401; and a function control circuit 101 which has a function of monitoring the state of the detection switch actuator 501, a function of turning on the power of the information processing apparatus 401 as well as starting to charge the portable telephone set 201 when the detection switch actuator 501 has detected accommodation of the portable telephone set 201, a function of reading ID information from the portable telephone set 201 via a data communication terminal 506 as well as making a host computer 103 recognize the ID information to make accessible the personal information of the portable telephone set 201, a function of terminating connection of the portable telephone set 201 to the information processing apparatus 401 and the host computer 103 when the detection switch actuator 501 detects the removal of the portable telephone set 201, and a function of managing time until start of the termination process and changing the set time. The portable telephone set 201 has an ID button 206, charging and data transfer terminals 207, and a concave section 208 corresponding to the detection switch actuator 501 of the portable telephone set receiving tray 405 of the information processing apparatus 401 etc., thus producing the following effects:

The above configuration realizes an access to a security system and a host computer by using a same portable device, i.e., by using a common ID for the security system and the host computer, thus producing the effect of eliminating the need for carrying unnecessarily many portable devices.

Further, there is no need for providing a separate charger in using a portable device which requires charging, thus producing the effect of reducing wall outlets and improving space efficiency.

Moreover, a computer system can be automatically started by simply placing the portable device on the information processing apparatus and the personal information of the user can be accessed, thus producing the effect of eliminating the need for troublesome operation and improving security through use of a password for access permission.

Further, ON/OFF of the information processing apparatus or the computer system is secured, thus producing the effect of preventing unnecessary energy consumption due to failure to turn off power, etc.

Although the foregoing description has assumed an integrated-type information processing apparatus 401 with a built-in function control section, in an embodiment where an image display section and a control section are separately provided, for example a desktop PC, the same effect is produced irrespective of whether a portable telephone set can be attached to the image display section or the control section.

Further, although explanation of this embodiment has assumed an office, implementing a similar system in each of the operating offices located in distant places and making feasible the communication between host computers can establish an individual computing environment in each of the operating offices by simply carrying a portable telephone set. This eliminates, for example, the need for carrying a laptop PC for data processing thus considerably enhancing convenience.

Second Embodiment

Figure 9A:
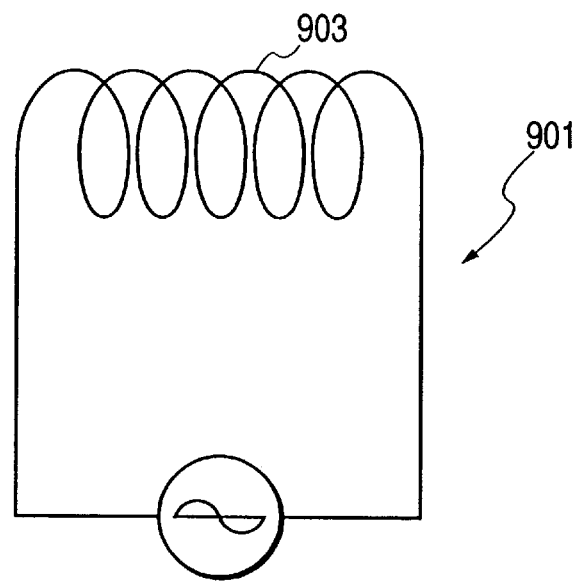
Figure 9B:
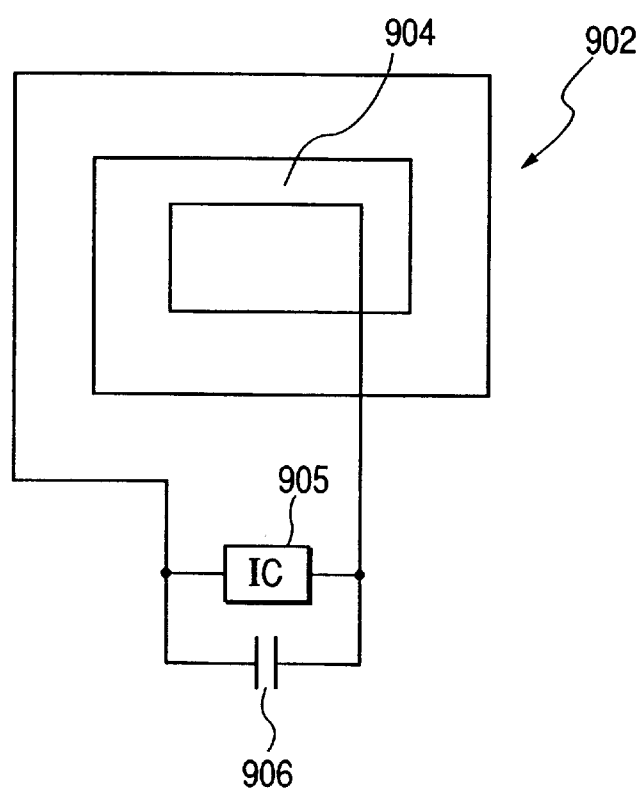
Figure 10:
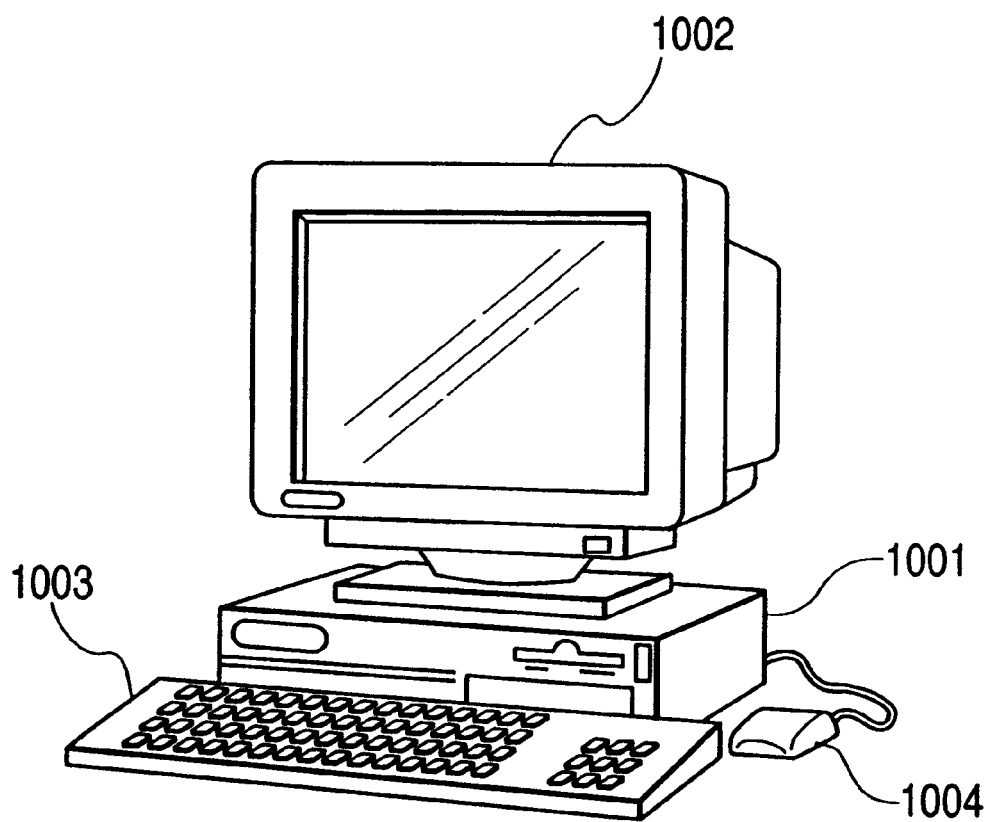
FIG. 10 is an external view of a computer system according to the prior example.
Figure 11:
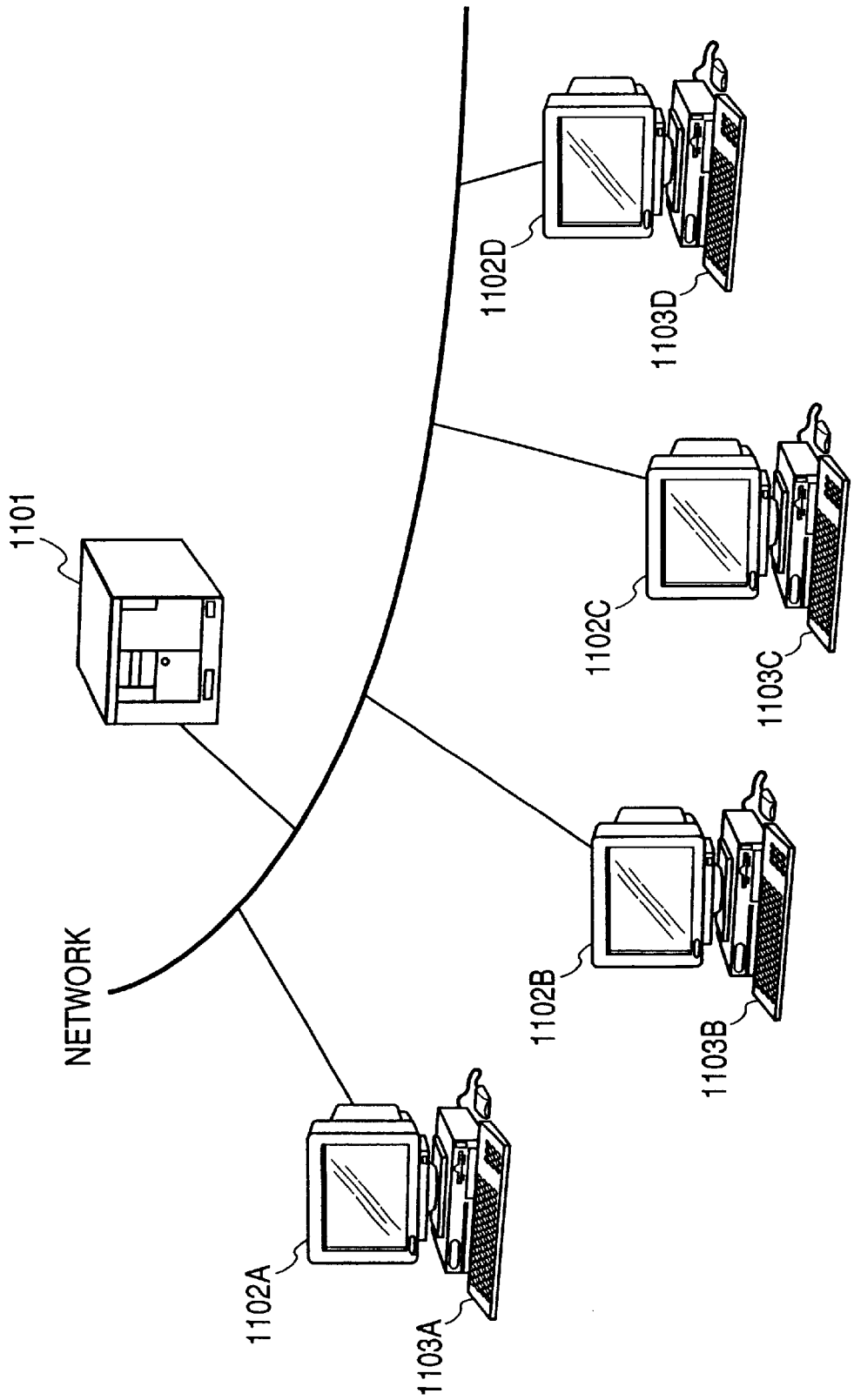
FIG. 11 is an explanatory diagram of a computer network system according to the prior example.

A second embodiment of the present invention allows charging/data communications without providing a contact by utilizing high-frequency waves and coils as shown in FIGS. 9A and 9B, in contrast with the above first embodiment where the information processing apparatus 401 and the portable telephone set 201 perform charging/data communications by using the detection switch actuator 501 and mutual inter-terminal connections.

FIGS. 9A and 9B are circuit diagrams for realizing charging/data communications in a system which consists of an information processing apparatus, a portable telephone set, and a host computer according to the second embodiment of the present invention, of which FIG. 9A is a circuit diagram of a high-frequency wave generator and FIG. 9B is a circuit diagram of a receiver. The high-frequency wave generator 901 is equipped with a coil 903. The receiver 902 is equipped with a coil 904, an IC 905 having non-volatile memory, and a capacitor 906.

The following details the above sections. The principle and the device are relatively simple. Applying an alternating current across the coil 903 of the high-frequency wave generator 901 in FIG. 9A causes the high-frequency wave generator 901 to emit a high-frequency wave. In FIG. 9B, the receiver 902 receives the high-frequency wave emitted from the above high-frequency wave generator 901 on the coil 904 of the receiver 902, which generates an electromotive force across the coil. The receiver 902 requires no particular power supply for extracting information from the receiver 902.

The receiver 902 is, as mentioned above, composed of a coil 904, an IC 905 having non-volatile memory, and a capacitor 906. The receiver 902 can convert high-frequency power received on the coil 904 into a DC power which it stores in the capacitor 906, then use the power stored in the capacitor 906 to transmit information stored in the IC 905 using the coil 904 as an antenna. The high-frequency wave generator 901 can synchronize the timing of transmission and reception in order to receive information transmitted from the receiver 902. The receiver 902 generates a power across the coil 904 on receiving high-frequency waves. Connecting this power to a battery provides charging.

As explained above, according to the second embodiment of the present invention, an effect similar to that of the above first embodiment can be realized by providing the information processing apparatus with the function of the high-frequency wave generator 901 instead of the terminal of the portable telephone set receiving tray 405 of the information processing apparatus 401 according to the above first embodiment as well as providing the portable telephone set with the function of the receiver 902 instead of the ID read section of the security system according to the above first embodiment.

In particular, concerning management of entrance/exit into/from an office, the user can enter or exit the office as if passing through an automatic door because ID code transmission/reception is automatically made by simply carrying a portable telephone set. At the same time, secure entrance/exit management is realized.

Although data communications can be provided through electrical connection or electromagnetic communications between the information processing apparatus and the portable telephone set according to the second and the first embodiment of the present invention, an optical approach such as infrared transmission can be also applied.

Third Embodiment

A third embodiment of the present invention provides the information processing apparatus with an ID card reader and a slit section as well as performs detection of ID card holding and ID card insertion/removal. The ID card used is the same as that used for the security system.

As explained above, because the information processing apparatus is provided with an ID card reader and a slit section and detection of ID card holding and ID card insertion/removal is performed using the slit section according to the third embodiment of the present invention, an effect similar to that of the above first and second embodiments can be realized, i.e., automatic startup of the computer system and an excellent security system in terms of energy reduction, portability and accommodation capability can be provided.

If personal extension numbers and central office line numbers are keyed to ID codes by installing a telephone set for personal communication and connecting the telephone set to an information processing apparatus, a host computer, a centralized telephone exchange which allows software-based telephone number assignment, a telephone set at the location of an information processing apparatus where the ID card is inserted can be assigned a telephone number corresponding to the ID number. This produces the effect of automatically setting a personal number of the telephone set on the desk selected by the individual, even in an office where no fixed desks are assigned to individuals.

The present invention can be applied to both a system composed of a plurality of components and a device composed of a single component. It is apparent that the purpose of the present invention can be achieved by providing the system or the device with a storage medium storing software program codes which realizes the above-mentioned functions of the embodiments and making the computer or CPU/MPU of the system or device read and execute the program codes stored in the storage medium.

In this case the program codes themselves read from the storage medium realizes the functions of the above-mentioned embodiments thus the storage medium storing the program codes constitute the present invention.

As a storage medium for providing the program codes, a floppy disk, a hard disk, an optical disc, a magneto-optical disc, a CD-ROM, a CD-R, a magnetic tape, a non-volatile memory card and a ROM, etc. can be used.

It is apparent that a case is included where the above-mentioned functions of the embodiments are realized by executing the program codes read by a computer as well as the above-mentioned functions of the embodiments are realized by a processing performed partially or wholly by the OS, etc. operating on the computer based on the instruction of the program codes.

Further, it is apparent that a case is included where the above-mentioned functions of the embodiments are realized by a processing performed partially or wholly the CPU, etc. provided on the function extension board or in the function extension unit according to the instruction of the program codes, after the program codes read from the storage medium is written into the memory provided on the function extension board inserted in the computer or in the function extension unit connected to the computer.

As mentioned above, according to the information processing apparatus of the present invention, said device is an information processing apparatus connected to a higher level device such as a computer and has a means for accommodating a portable device in a detachable way as well as connecting the portable device and the information processing apparatus main unit in such a way as communication is enabled, thus producing the following effects: For example, storing ID information in a portable device and transmitting the ID information from the portable device attached to the information processing apparatus to an information processing apparatus main unit and a higher level device such as a computer can realize an access to a security system and the higher level device (host computer), i.e., use of a common ID for the security system and the host computer, thus eliminating the need for carrying unnecessarily many portable devices.

According to the information processing apparatus of the present invention, said accommodation means comprises a detection means for detecting accommodation/removal of the portable device and a communication means for transmitting ID information sent from the portable device to the information processing apparatus main unit, thus producing the following effects: Because an access to the personal information of the user is allowed, troublesome operation is not required and because an access permission uses a password, security is improved.

According to the information processing apparatus of the present invention, said information processing apparatus has a control means for monitoring the state of said detection means, thus producing the following effects: Similar effects to those described above as well as secure monitoring of accommodation/removal of the portable device into/from the information processing apparatus.

According to the information processing apparatus of the present invention, said control means turns on the power of the information processing apparatus main unit when said detection means has detected accommodation of a portable device in said accommodation means, thus producing the following effects: A computer system can be automatically started by simply placing a portable device on an information processing apparatus.

According to the information processing apparatus of the present invention, said control means turns on the power of the information processing apparatus main unit as well as starts charging a portable device when said detection means has detected accommodation of a charge-type portable device, thus producing the following effects: A computer system can be automatically started by simply placing a portable device on an information processing apparatus. There is no need for eliminating the need for separately providing a charger in a case where a portable device which requires charging is used, thus reducing wall outlets and improving space efficiency.

According to the information processing apparatus of the present invention, said control means reads ID information from a portable device via said communication means as well as making a higher level device recognize the ID information to enable an access to the personal information managed by the higher level device when said detection means has detected accommodation of a portable device in said accommodation means, thus producing the following effects: Because an access to the personal information is allowed, no troublesome operation is required and because access permission uses a password, a higher security is assured.

According to the information processing apparatus of the present invention, a portable device is a portable telephone set and has a voice recognition means via a microphone of the portable telephone set, thus allowing voice input and eliminates the need for a microphone on the information processing apparatus main unit.

According to the information processing apparatus of the present invention, said control means terminates connection of a portable telephone set to an information processing apparatus main unit and a higher level device when said detection means has detected removal of the portable device from said accommodation means, thus producing the following effects: ON/OFF of the information processing apparatus or a computer system is secured, thus preventing unnecessary energy consumption due to failure to turn off power, etc.

According to the information processing apparatus of the present invention, said control means manages time until start of the termination process and changes the set time based on an external input, thus producing the following effects: Effects similar to those described above as well as proper system administration.

According to the information processing apparatus of the present invention, said information processing apparatus has a means for performing data communications with a removed portable device when the information processing apparatus main unit is in work continuation state and the portable device is removed; a means for notifying the removed portable telephone set of an incoming e-mail; a means for forwarding the incoming e-mail contents to the removed portable device; and a means for undergoing remote operation from the removed portable device, thus producing the following effects: The user of the information processing apparatus knows presence of an incoming e-mail and obtains the contents of said e-mail even when he/she has temporarily left the desk with work continuation specified, and can terminate the use of the information processing apparatus while not being at the desk.

According to the information processing apparatus of the present invention, said communication means performs electrical communications between a portable device and an information processing apparatus main unit connected to a higher level device such as a computer, thus producing the following effects: Performing electrical communications between the portable device and the information processing apparatus main unit, same as the inventions described above, realizes an access to a security system and a higher level device (host computer) by using the same portable device, i.e., by using a common ID for the security system and the host computer, thus eliminating the need for carrying unnecessarily many portable devices; there is no need for providing a separate charger in using a portable device which requires charging, thus reducing wall outlets and improving space efficiency; a computer system can be automatically started by simply placing the portable device on the information processing apparatus and the personal information of the user can be accessed, thus eliminating the need for troublesome operation and improving security through use of a password for access permission; ON/OFF of the information processing apparatus or the computer system is secured, thus preventing unnecessary energy consumption due to failure to turn off power, etc.

According to the information processing apparatus of the present invention, said communication means performs electromagnetic communications between a portable device and an information processing apparatus main unit connected to a higher level device such as a computer, thus producing the following effects: Performing electromagnetic communications between the portable device and the information processing apparatus main unit connected to a higher level device such as a computer, same as the inventions described above realizes an access to a security system and a higher level device (host computer) by using the same portable device, i.e., by using a common ID for the security system and the host computer, thus eliminating the need for carrying unnecessarily many portable devices; there is no need for providing a separate charger in using a portable device which requires charging, thus reducing wall outlets and improving space efficiency; a computer system can be automatically started by simply placing the portable device on the information processing apparatus and the personal information of the user can be accessed, thus eliminating the need for troublesome operation and improving security through use of a password for access permission; ON/OFF of the information processing apparatus or the computer system is secured, thus preventing unnecessary energy consumption due to failure to turn off power, etc.

According to the information processing apparatus of the present invention, said communication means performs optical communications such as infrared transmission between a portable device and an information processing apparatus main unit, thus producing the following effects: Performing optical communications such as infrared transmission between the portable device and the information processing apparatus main unit connected to a higher level device such as a computer, same as the inventions described above, realizes an access to a security system and a higher level device (host computer) by using the same portable device, i.e., by using a common ID for the security system and the host computer, thus eliminating the need for carrying unnecessarily many portable devices; there is no need for providing a separate charger in using a portable device which requires charging, thus reducing wall outlets and improving space efficiency; a computer system can be automatically started by simply placing the portable device on the information processing apparatus and the personal information of the user can be accessed, thus eliminating the need for troublesome operation and improving security through use of a password for access permission; ON/OFF of the information processing apparatus or the computer system is secured, thus preventing unnecessary energy consumption due to failure to turn off power, etc.

According to the information processing apparatus of the present invention, said portable device is a portable telephone set or an ID card, thus producing the following effects: Same as the inventions described above, an access is realized to a security system and a higher level device (host computer) by using the same portable device, i.e., by using a common ID for the security system and the host computer, thus eliminating the need for carrying unnecessarily many portable devices; there is no need for providing a separate charger in using a portable device which requires charging, thus reducing wall outlets and improving space efficiency; a computer system can be automatically started by simply placing the portable device on the information processing apparatus and the personal information of the user can be accessed, thus eliminating the need for troublesome operation and improving security through use of a password for access permission; ON/OFF of the information processing apparatus or the computer system is secured, thus preventing unnecessary energy consumption due to failure to turn off power, etc.

According to the information processing apparatus of the present invention, ID information of a portable device can be transmitted to a security system which manages entrance/exit of an owner of the portable device, thus producing the following effects: An access is realized to the security system and a higher level device (host computer) by using the same portable device, i.e., by using a common ID for the security system and the host computer, thus eliminating the need for carrying unnecessarily many portable devices.

According to the information processing apparatus of the present invention, ID information read from an ID card can be transmitted to a security system which manages entrance/exit of an owner of the ID card and setting of the number of a fixed-type telephone set is allowed based on the ID information, thus producing the following effects: An access is realized to the security system and a higher level device (host computer) by using the same portable device, i.e., by using a common ID for the security system and the host computer, thus eliminating the need for carrying unnecessarily many portable devices.

What is claimed is:

1. An information processing apparatus, comprising:
   an information processing unit;
   a portable device attachable to said information processing unit, said portable device capable of communicating with an external device via radio wave by radio wave transmitting and receiving means in a state independent of said information processing apparatus;
   accommodation means for accommodating said portable device in a detachable way;
   detection means for detecting accommodation/removal of said portable device in/from said accommodation means;
   read means for reading ID information transmitted from an information transmitting means different from said radio transmitting and receiving means;
   requiring means for requiring an input of a password;
   authentication means for authenticating the inputted password; and
   control means for enabling said information processing apparatus to access personal information corresponding to the ID information when the inputted password is authenticated by said authentication means,
   wherein said requiring means requires the input of the password when it is determined by said detection means that a time period from the removal of said portable device from said accommodation means to the accommodation of said portable device in said accommodation means is equal to or longer than a predetermined time period, and said requiring means does not require the input of the password when it is determined by said detection means that the time period from the removal of said portable device from said accommodation means to the accommodation of said portable device in said accommodation means is shorter than the predetermined time period.

2. The information processing apparatus according to claim 1, wherein said control means turns on the power of the information processing apparatus when said detection means detects accommodation of said portable device in said accommodation means.

3. The information processing apparatus according to claim 2, wherein said control means turns on the power of the information processing apparatus as well as starts charging said portable device when said detection means detects accommodation of a charge-type portable device.

4. The information processing apparatus according to claim 2, further comprising termination control means for controlling a connection termination process of said portable device and the information processing apparatus when said detection means detects removal of said portable device from said accommodation means.

5. The information processing apparatus according to claim 4, wherein said termination control means performs time management until the start of the termination process.

6. The information processing apparatus according to claim 4, further comprising means for performing data communications with a removed portable device when the information processing apparatus is in a work continuation state and said portable device is removed.

7. The information processing apparatus according to claim 6, further comprising means for notifying said removed portable device of an incoming e-mail.

8. The information processing apparatus according to claim 7, further comprising an incoming e-mail to said removed portable device.

9. The information processing apparatus according to claim 4, further comprising means for undergoing remote operation from said removed portable device.

10. The information processing apparatus according to claim 1, wherein the information processing apparatus makes a higher level device recognize ID information of said portable device via connection means which connects to the higher level device when said connection means and detection means have detected accommodation of said portable device in said accommodation means to make accessible personal information managed by the higher level device.

11. The information processing apparatus according to claim 1, wherein said portable device is a portable telephone set or an ID card.

12. The information processing apparatus according to claim 1, wherein ID information of a portable device can be transmitted to a security system which manages entrance/exit of an owner of said portable device.

13. The information processing apparatus according to claim 1, wherein ID information read from an ID card can be transmitted to a security system which manages entrance/exit of an owner of the ID card and setting of the number of a fixed-type telephone set is allowed based on the ID information.

14. An inter-device communication method applied to a system equipped with an information processing apparatus and a portable device, said portable device capable of communicating with an external device via radio wave by radio wave transmitting and receiving means in a state independent of said information processing apparatus, wherein said inter-device communication method comprises:

a detection step wherein the information processing apparatus which accommodates the portable device in a detachable way as well as connects the portable device and the information processing apparatus in such a way as communication is enabled detects accommodation/removal of the portable device;

a communication step wherein ID information is transmitted from the portable device to the information processing apparatus;

a requiring step of requiring a password to be input;

an authenticating step of authenticating the input password; and a control step wherein the information processing apparatus is enabled to access personal information corresponding to the ID information read when the password is authenticated, wherein said requiring step is required when it is determined in said detection step that a time period from the removal of the portable device from the information processing apparatus to the accommodation of the portable device in the information processing apparatus is equal to or longer than a predetermined time period, and said requiring step does not require the input of the password when it is determined in said detection step that the time period from the removal of the portable device from the information processing apparatus to the accommodation of the portable device in the information processing apparatus is shorter than the predetermined time period.

15. The inter-device communication method according to claim 14, further comprising a control step for monitoring said detection step.

16. The inter-device communication method according to claim 15, wherein, in said control step, the power of the information processing apparatus is turned on when accommodation of the portable device in the information processing apparatus is detected in said detection step.

17. The inter-device communication method according to claim 15, wherein, in said control step, the power of the information processing apparatus is turned on as well as charging of the portable device is started when accommodation of a charge-type portable device in the information processing apparatus is detected in said detection step.

18. The inter-device communication method according to claim 15, wherein, in said control step, ID information is read from a portable device as well as the ID information is made known to a higher level device via said communication step when accommodation of the portable device in the information processing apparatus is detected in said detection step, and access to the personal information managed by the higher level device is made possible.

19. The inter-device communication method according to claim 15, wherein, in said control step, connection termination process of the portable device to the information processing apparatus and the higher level device is performed when removal of the portable device from the information processing apparatus is detected in said detection step.

20. The inter-device communication method according to claim 19, wherein, in said control step, time management until the start of said termination process and change to time setting based on an external input are performed.

21. The inter-device communication method according to claim 14, wherein, data communications are performed between an information processing main unit and a removed portable device when the information processing apparatus main unit is in a work continuation state and the portable device is removed.

22. The inter-device communication method according to claim 21, wherein data communication is an incoming e-mail notification.

23. The inter-device communication method according to claim 21, wherein data communication includes contents of incoming e-mail transferred from the removed information processing apparatus.

24. The inter-device communication method according to claim 21, wherein data communication is an information processing apparatus remote operation command.

25. The inter-device communication method according to claim 14, wherein, in said communication step, electrical communications are performed between a portable device and an information processing apparatus.

26. The inter-device communication method according to claim 14, wherein, in said communication step, electromagnetic communications are performed between the portable device and the information processing apparatus.

27. The inter-device communication method according to claim 14, wherein, in said communication step, optical communications such as infrared transmission are performed between the portable device and the information processing apparatus.

28. The inter-device communication method according to claim 14, wherein said portable device is a portable telephone set or an ID card.

29. The inter-device communication method according to claim 14, wherein ID information of portable device can be transmitted to a security system which manages entrance/exit of an owner of the portable device.

30. The inter-device communication method according to claim 14, wherein ID information read from an ID card can be transmitted to a security system which manages entrance/exit of an owner of the ID card and setting of the number of a fixed-type telephone set is allowed based on the ID information.

31. A computer-readable storage medium storing a program which executes an inter-device communication method applied to a system equipped with an information processing apparatus connected to a higher level device such as a computer and a portable device, the portable device capable of communicating with an external device via radio wave by radio wave transmitting and receiving means in a state independent of the information processing apparatus, with said program containing code for performing:

a detection step for detecting accommodation/removal of the portable device;

a communication step for communicating ID information transmitted from the portable device to the information processing apparatus;

a requiring step of requiring a password to be input;

an authenticating step of authenticating the input password; and a control step wherein the information processing apparatus is enabled to access personal information corresponding to the ID information read when the password is authenticated, wherein said requiring step is required when it is determined in said detection step that a time period from the removal of the portable device from the information processing apparatus to the accommodation of the portable device in the information processing apparatus is equal to or longer than a predetermined time period, and said requiring step does not require the input of the password when it is determined in said detection step that the time period from the removal of the portable device from the information processing apparatus to the accommodation of the portable device in the information processing apparatus is shorter than the predetermined time period.

* * * * *

UNITED STATES PATENT AND TRADEMARK OFFICE
CERTIFICATE OF CORRECTION

PATENT NO. : 6,763,252 B2  Page 1 of 1
DATED : July 13, 2004
INVENTOR(S) : Toshiaki Itazawa It is certified that error appears in the above-identified patent and that said Letters Patent is hereby corrected as shown below:

Title page,
Item [57], ABSTRACT,
Line 7, "to" should read -- too --.

Column 2,
Line 4, "need" should read -- needed --.

Signed and Sealed this

Twenty-third Day of November, 2004

JON W. DUDAS
*Director of the United States Patent and Trademark Office*